(12) United States Patent
Al-Daher et al.

(10) Patent No.: US 10,771,298 B2
(45) Date of Patent: Sep. 8, 2020

(54) MOBILE COMMUNICATIONS NETWORK

(71) Applicant: British Telecommunications Public Limited Company, London (GB)

(72) Inventors: Zaid Al-Daher, London (GB); Richard Mackenzie, London (GB); Michael Fitch, London (GB)

(73) Assignee: British Telecommunications Public Limited Company, London (GB)

(*) Notice: Subject to any disclaimer, the term of this patent is extended or adjusted under 35 U.S.C. 154(b) by 0 days.

(21) Appl. No.: 16/318,533

(22) PCT Filed: Jun. 19, 2017

(86) PCT No.: PCT/EP2017/064946
§ 371 (c)(1),
(2) Date: Jan. 17, 2019

(87) PCT Pub. No.: WO2018/024395
PCT Pub. Date: Feb. 8, 2018

(65) Prior Publication Data
US 2019/0268197 A1    Aug. 29, 2019

(30) Foreign Application Priority Data

Aug. 4, 2016 (EP) ..................................... 16182850

(51) Int. Cl.
*H04L 27/26* (2006.01)
*H04L 5/00* (2006.01)
*H04W 4/06* (2009.01)

(52) U.S. Cl.
CPC ........ *H04L 27/2607* (2013.01); *H04L 5/0037* (2013.01); *H04L 5/0053* (2013.01); *H04L 5/0058* (2013.01); *H04W 4/06* (2013.01)

(58) Field of Classification Search
CPC . H04L 27/2607; H04L 5/0058; H04L 5/0053; H04L 5/0037; H04W 4/06;
(Continued)

(56) References Cited

U.S. PATENT DOCUMENTS 7,885,235 B2    2/2011  Mochizuki et al.
8,554,211 B2 *  10/2013  Angelow ............. H04J 11/0093
                                                    455/434
(Continued)

FOREIGN PATENT DOCUMENTS

CN          102300168 A       12/2011
CN          104540043 A        4/2015
(Continued)

OTHER PUBLICATIONS

International Search Report and Written Opinion for corresponding International Application No. PCT/EP2017/064946 dated Jul. 10, 2017; 9 pages.

(Continued)

*Primary Examiner* — Sharad Rampuria
(74) *Attorney, Agent, or Firm* — Patterson Thuente Pedersen, P.A.

(57) ABSTRACT

At a mobile terminal: communicating with a serving base station over multicast; receiving a first multicast signal from the serving base station and a second signal from a second base station; determining an indication of the length of a first cyclic prefix of the first multicast signal and an indication of the length of a second cyclic prefix of the second signal; and where the mobile terminal determines that the lengths of the first and second cyclic prefixes are different, initiating a switch in communication between the mobile terminal and the serving base station to unicast. In complementary fashion, at a base station serving a mobile terminal over multicast; sending to the mobile terminal a multicast signal (Continued)

comprising a first cyclic prefix with a first length; receiving from the mobile terminal an indication that the mobile terminal has detected a second cyclic prefix with a second length and switching communicating with the mobile terminal from multicast to unicast.

13 Claims, 4 Drawing Sheets

(58) Field of Classification Search
CPC ...... G06F 17/14; G06F 17/145; G06F 17/147; H04J 13/0044; H04J 13/0051
See application file for complete search history.

(56) References Cited

U.S. PATENT DOCUMENTS

| | | | |
|---|---|---|---|
| 8,588,171 | B2 | 11/2013 | Fukuoka et al. |
| 8,644,261 | B1 | 2/2014 | Vargantwar et al. |
| 9,001,737 | B2 | 4/2015 | Amerga et al. |
| 9,191,922 | B2 | 11/2015 | Anchan et al. |
| 9,439,171 | B2 | 9/2016 | Phan et al. |
| 9,648,584 | B2 | 5/2017 | Hiben et al. |
| 9,723,523 | B2 | 8/2017 | Purnadi et al. |
| 9,763,151 | B2 | 9/2017 | Kim |
| 10,070,413 | B2 | 9/2018 | Phan et al. |
| 10,084,581 | B2 * | 9/2018 | Sun ................... H04W 72/042 |
| 10,219,245 | B2 | 2/2019 | Prasad et al. |
| 10,231,174 | B2 | 3/2019 | Byun et al. |
| 10,277,416 | B2 | 4/2019 | Zhu et al. |
| 2002/0067909 | A1 | 6/2002 | Iivonen |
| 2002/0112244 | A1 | 8/2002 | Liou et al. |
| 2004/0106412 | A1 | 6/2004 | Laroia et al. |
| 2008/0132263 | A1 | 6/2008 | Yu et al. |
| 2008/0267317 | A1 * | 10/2008 | Malladi ................ H04L 5/0048 375/299 |
| 2009/0175183 | A1 | 7/2009 | Mochizuki et al. |
| 2009/0274453 | A1 | 11/2009 | Viswambharan et al. |
| 2010/0077441 | A1 | 3/2010 | Thomas et al. |
| 2010/0216454 | A1 | 8/2010 | Ishida et al. |
| 2011/0305184 | A1 | 12/2011 | Hsu et al. |
| 2013/0044614 | A1 | 2/2013 | Aguirre |
| 2013/0170818 | A1 | 7/2013 | Klappert et al. |
| 2013/0229974 | A1 | 9/2013 | Xu et al. |
| 2013/0251329 | A1 | 9/2013 | McCoy et al. |
| 2013/0258934 | A1 | 10/2013 | Amerga et al. |
| 2013/0258935 | A1 | 10/2013 | Zhang et al. |
| 2013/0336173 | A1 | 12/2013 | Mandil et al. |
| 2014/0095668 | A1 | 4/2014 | Oyman et al. |
| 2014/0156800 | A1 | 6/2014 | Falvo |
| 2014/0169255 | A1 | 6/2014 | Zhang et al. |
| 2014/0192697 | A1 | 7/2014 | Anchan et al. |
| 2014/0286222 | A1 | 9/2014 | Yu et al. |
| 2014/0321826 | A1 | 10/2014 | Stelmack et al. |
| 2015/0009821 | A1 | 1/2015 | Sridhar et al. |
| 2015/0117323 | A1 | 4/2015 | Hiben et al. |
| 2015/0163379 | A1 | 6/2015 | Herzog et al. |
| 2016/0081070 | A1 | 3/2016 | Xiaodong et al. |
| 2016/0105894 | A1 | 4/2016 | Lu et al. |
| 2016/0211980 | A1 | 7/2016 | Zhu et al. |
| 2016/0234570 | A1 | 8/2016 | Van Deventer et al. |

FOREIGN PATENT DOCUMENTS

| | | |
|---|---|---|
| CN | 104954994 A | 9/2015 |
| EP | 1650989 A1 | 4/2006 |
| EP | 2244502 A1 | 10/2010 |
| EP | 2244502 B1 | 6/2011 |
| EP | 2606662 A1 | 6/2013 |
| EP | 2775730 A1 | 9/2014 |
| EP | 2925003 A1 | 9/2015 |
| EP | 3125582 A1 | 2/2017 |
| GB | 2483125 A | 2/2012 |
| JP | 2013070841 A | 4/2013 |
| WO | WO-2009094744 A1 | 8/2009 |
| WO | WO-2012137078 A2 | 10/2012 |
| WO | WO-2012142428 A1 | 10/2012 |
| WO | WO-2013141874 A1 | 9/2013 |
| WO | WO-2014146617 A1 | 9/2014 |
| WO | WO-2015000912 A1 | 1/2015 |
| WO | WO-2015039888 A1 | 3/2015 |
| WO | WO-2015061983 A1 | 5/2015 |
| WO | WO-2015062443 A1 | 5/2015 |
| WO | WO-2015069407 A1 | 5/2015 |
| WO | WO-2015071461 A1 | 5/2015 |
| WO | WO-2015080407 A1 | 6/2015 |
| WO | WO-2015103947 A1 | 7/2015 |
| WO | WO-2015166087 A2 | 11/2015 |
| WO | WO-2016029938 A1 | 3/2016 |
| WO | WO-2017089183 A1 | 6/2017 |
| WO | WO-2017167648 A1 | 10/2017 |
| WO | WO-2017167835 A1 | 10/2017 |
| WO | WO-2017167838 A1 | 10/2017 |
| WO | WO-2018001897 A1 | 1/2018 |

OTHER PUBLICATIONS

Prasad et al; "Enabling group communication for public safety in LTE-Advanced networks", Journal of Network and Computer Application, pp. 41-52; revised Aug. 28, 2015; 12 pages.
Qualcomm Research; San Diego, "LTE eMBMS Technology Overview", Nov. 2012; 18 pages.
Prasad et al; "Enhancements for Enabling Point-to-Multipoint Communication Using Unlicensed Spectrum"; https://www.reserachgate.net/publication/324783210; May 1, 2018; 7 pages.
EP Extended Search Report for corresponding EP Application No. 16182850.4; dated Jan. 17, 2017, 7 pages.
GB Search and Examination Report for corresponding GB Application No. GB1613477.7; dated Dec. 19, 2016, 5 pages.
Prasad Athul et al; "Enabling group communication for public safety in LTE-Advanced networks" A Journal of Network and Computer Applications, Academic Press. vol. 62. Jan. 2, 2016 (Jan. 2, 2016) pp. 41-52 XP029418728 NY. US ISSN: 1084-8045. DOI: 10.1016/J.JNCA.2015.10.014 abstract Sections 1-6.
Examination Report for GB Application No. GB1611277.3, dated Jun. 26, 2019, 4 pages.
Sharetechnote, "Multi Cell-Measurement in LTE," Nov. 28, 2019, 16 pages.
"HbbTV 2.0.2 Specification," HbbTV Association, Retrieved on Apr. 24, 2018 from https://www.hbbtv.org/wpcontent/uploads/2018/02/HbbTVv202 specification_2018 02_16.pdf, Feb. 16, 2018, 313 pages.
3GPP TR 23.768 V12.1.0 (Jun. 2014), "Study on Architecture Enhancements to Support Group Communication System Enablers for LTE (GCSE_LTE)," Technical Report, 3rd Generation Partnership Project, Technical Specification Group Services and System Aspects (Release 12), Jun. 2014, 63 pages.
3GPP TS 23.246 V9.5.0, release 9 (Jun. 2010), "LTE; Multimedia Broadcast/Multicast Service (MBMS), Architecture and Functional Description," Universal Mobile Telecommunications System (UMTS), Technical Specification, ETSI TS 123 246, Jun. 2010, 67 pages.
3GPP TS 23.468 V15.0.0 (Release 15), "LTE; Group Communication System Enablers for LTE (GCSE_LTE) Stage 2," Technical Specification Group Services and System Aspect, 3rd Generation Partnership Project, ETSI TS 123 468 V15.0.0, Jul. 2018, 32 pages.
Alcatel-Lucent, "Analysis of Service Continuity Requirement for Group Communication," 3GPP Draft; R2-140757, 3GPP TSG RAN WG2 Meeting #85, and Agenda Item: 7.6.3, Prague, Czech Republic, Feb. 10-14, 2014, 3 pages.
CATT, "Considerations on Service Continuity for eMBMS," 3GPP Draft; R2-134045, 3GPP TSG RAN WG2 Meeting #84, agenda Item: 7.6.3, San Francisco, USA, Nov. 2013, 4 pages.
CATT, "Evaluation on Service Continuity for eMBMS," 3GPP Draft; R2-140138, 3rd Generation Partnership Project (3GPP), Mobile Competence Centre ; 650, Route Des Lucioles ; F-06921 Sophia-Antipolis Cedex; France, vol. RAN WG2, Feb. 9, 2014, retrieved from URL: http://www.3gpp.org/ftp/Meetings_3GPP_SYNC/RAN2/Docs/, 3 pages.

(56) References Cited

OTHER PUBLICATIONS

CATT, "Methods for Service Continuity Improvement due to UE Mobility," 3GPP Draft; R2-140141, 3GPP TSG RAN WG2 Meeting #85, Prague, Czech Republic, Feb. 10-14, 2014, 3 pages.
Combined search and Examination Report for Great Britain Application No. 1605519.6, dated Sep. 28, 2016, 4 pages.
Combined Search and Examination Report for Great Britain Application No. 1605525.3, dated Oct. 3, 2016, 8 pages.
Combined Search and Examination Report for Great Britain Application No. 1609547.3, dated Nov. 30, 2016, 6 pages.
Combined Search and Examination Report for Great Britain Application No. 1611277.3, dated Dec. 6, 2016, 8 pages.
Combined Search and Examination Report for Great Britain Application No. 1613477.7, dated Dec. 19, 2016, 5 pages.
Ericsson, "MBMS Service Continuity Aspects for Group Communication," 3GPP Draft; R2-140821, 3rd Generation Partnership Project (3GPP), Mobile Competence Centre; 650, Route Des Lucioles; F-06921 Sophia-Antipolis Cedex, France, vol. RAN WG2, Feb. 9, 2014, retrieved from URL: http://www.3gpp.org/ftp/Meetings_3GPP_SYNC/RAN2/Docs/, 11 pages.
ETSI TS 103 286-2 VI.I.1 (May 2015), "Technical Specification; Digital Video Broadcasting (DVB), Companion Screens and Streams, Part 2: Content Identification and Media Synchronization," 650 Route des Lucioles F-06921 Sophia Antipolis Cedex, France, http://www.etsi.org/deliver/etsi_tsII103200103299/10328602/01.01.01_60/ts10328602v010101p.pdf, retrieved on Apr. 24, 2018, 166 pages.
ETSI TS 123.246 "Universal Mobile Telecommunication System (UMTS); LTE; Multimedia Broadcast/Multicast Service (MBMS); Architecture and Functional Description (Release 9)," V9.5.0 (Jun. 2010); the 3rd Generation Partnership Project, pp. 1-67.
European Search Report for Application No. 16176922.9, dated Nov. 23, 2016, 11 pages.
European Search Report for Application No. 16163451.4, dated Sep. 28, 2016, 8 pages.
European Search Report for Application No. 16163458.9, dated Sep. 20, 2016, 11 pages.
European Search Report for Application No. 16172341.6, dated Jun. 14, 2017, 10 pages.
European Search Report for Application No. EP15196875.7, dated May 19, 2016, 6 pages.
Examination Report for Great Britain Application No. 1521000.8 dated Nov. 27, 2017, 12 pages.
Examination Report for Great Britain Application No. 1605519.6 dated Sep. 27, 2018, 4 pages.
Huawei, HiSilicon "Service Continuity for Group Communication Over eMBMS," 3GPP Draft; R2-140261, 3GPP TSG-RAN WG2 #85, Prague, Czech Republic, Feb. 10-14, 2014, 7 pages.
International Preliminary Report on Patentability for Application No. PCT/EP2016/077747, dated Jan. 18, 2018, 10 pages.
International Preliminary Report on Patentability for Application No. PCT/EP2017/057026, dated Oct. 11, 2018, 10 pages.
International Preliminary Report on Patentability for Application No. PCT/EP2017/057470, dated Oct. 11, 2018, 10 pages.
International Preliminary Report on Patentability for Application No. PCT/EP2017/057474, dated Oct. 11, 2018, 8 pages.
International Preliminary Report on Patentability for corresponding PCT Application No. PCT/EP2017/065543, dated Aug. 17, 2018, 29 pages.
International Search Report and Written Opinion for Application No. PCT/EP2016/077747, dated Jan. 24, 2017, 12 pages.
International Search Report and Written Opinion for Application No. PCT/EP2017/057026, dated Apr. 18, 2017, 14 pages.
International Search Report and Written Opinion for Application No. PCT/EP2017/057470, dated Jun. 19, 2017, 12 pages.
International Search Report and Written Opinion for Application No. PCT/EP2017/057474, dated Jun. 13, 2017, 14 pages.
International Search Report and Written Opinion for Application No. PCT/EP2017/065543, dated Jul. 24, 2017, 17 pages.
LG Electronics Inc, "Service continuity for group communication," 3GPP Draft; R2-140766, 3GPP TSG RAN WG2 #85, Agenda Item: 7.6.3, Prague, Czech Republic, Feb. 10-14, 2014, 2 pages.
LTE, "Multicast Broadcast Single Frequency Network (MBSFN) Handbook," ShareTechnote, retrieved from http://www.sharetechnote.com/html/Handbook_LTE_MBSFN.html on Sep. 14, 2018, 13 pages.
NEC Corporation, "Enabling Service Continuity for Group Communication," 3GPP Draft; R2-140586_GCSE_SC, 3GPP TSG RAN2 Meeting #85, and Agenda Item: 7.6.3, Prague, Czech Republic, Feb. 10-14, 2014, 7 pages.
QUALCOMM Incorporated, "GCSE Service Continuity During Unicast and MBMS Switching," 3GPP Draft S2-133446 UC BC Switching, SA WG2 Meeting #99, Agenda Item: 6.5, Xiamen, China, Sep. 2013, 7 pages.
Small Cell Forum, "X2 Interoperability," Release Four, Document 059.04.01, www.smallcellforum.org, Jun. 2014, 29 pages.
Written Opinion of the International Preliminary Examining Authority for Application PCT/EP2017/065543, dated Jun. 1, 2018, 11 pages.
Wu, et al., "CloudMo V: Cloud-based Mobile Social TV," Retrieved on Apr. 24, 2018 from http://i.cs.hku.hk/~cwu/papers/ywutmm12.pdf, 2012, 12 pages.
ZTE, "Service Continuity for Group Communication due to UE Mobility," 3GPP Draft; R2-140101, 3GPP TSG-RAN WG2#85, and Agenda Item: 7.6.3, Prague, Czech Republic, Feb. 10-14, 2014, 3 pages.
Application and Filing Receipt for U.S. Appl. No. 15/774,934, filed May 9, 2018, Inventor(s): Rennison et al.
U.S. Appl. No. 16/310,948, filed Dec. 18, 2018, Inventor(s):Mackenzie., et al.
U.S. Appl. No. 16/085,257, filed Sep. 14, 2018, Inventors: Mackenzie et al.
U.S. Appl. No. 16/085,328, filed Sep. 14, 2018, Inventors: Mackenzie et al.
U.S. Appl. No. 16/085,382, filed Sep. 14, 2018, Inventors: Al-Daher et al.

* cited by examiner

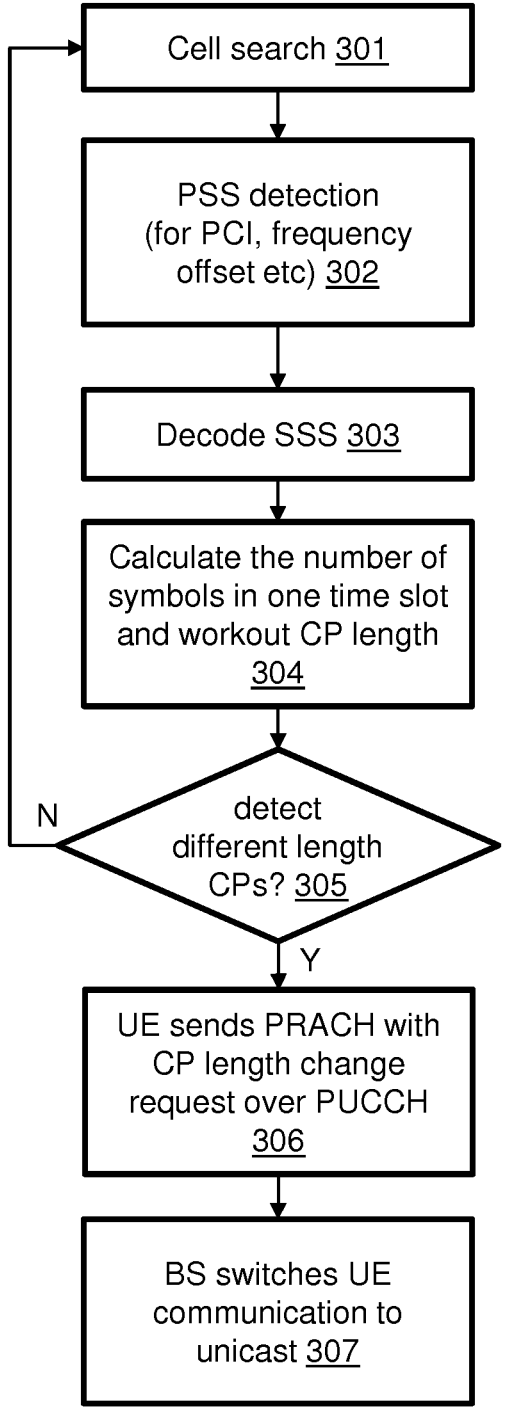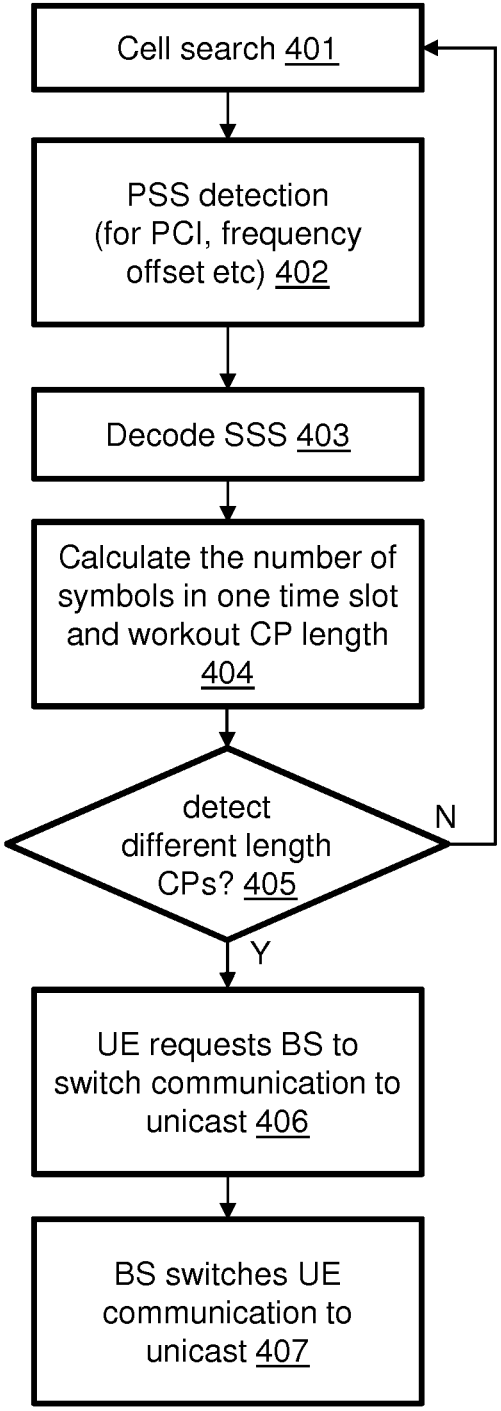
Figure 3                    Figure 4

MOBILE COMMUNICATIONS NETWORK

CROSS-REFERENCE TO RELATED APPLICATION

The present application is a National Phase entry of PCT Application No. PCT/EP2017/064946, filed Jun. 19, 2017, which claims priority from EP Patent Application No. 16182850.4, filed Aug. 4, 2016 each of which is hereby fully incorporated herein by reference.

TECHNICAL FIELD

The present disclosure relates to mobile communication networks.

BACKGROUND

Multimedia content, such as video playback, live streaming, online interactive gaming, file delivery and mobile TV, is seen as the key driver for data traffic demand on wireless cellular networks. Multimedia content to a large number of users can be distributed by unicast, broadcast and multicast. In the following, the term "multicast" is used to include "broadcast" and vice versa. Unicast is a dedicated bidirectional point-to-point link for transmission between the base station and one user mobile device. Evolved Multimedia Broadcast Multicast Service (eMBMS) is an LTE technique offering a specific multicast bearer to deliver data content to multiple users over shared downlink resources, which is more efficient than dedicating a unicast bearer for each user. Multicast-broadcast single-frequency network (MBSFN) further improves spectral efficiency by dynamically forming single-frequency networks whereby a mobile terminal (in LTE, the eNodeB) can seamlessly receive the same content over eMBMS from multiple base stations within a MBSFN area. A single-frequency network comprises groups of adjacent eMBMS base stations at which the same signal is synchronized and broadcast simultaneously on the same MBSFN sub-carrier frequency. The combination of eMBMS transmission from multiple base stations in a MBSFN service area provides a degree of transmission robustness in the form of spatial transmit diversity and effectively eliminates internal cell edges. However, a problem exists in handling the transfer of a mobile terminal between different MBSFN areas and between MBSFN and reserved unicast cells. A similar a problem exists in handling the transfer of a mobile terminal between eMBMS cells. Seamless mobility of the mobile terminals across an LTE network with different MBSFNs is not supported in 3GPP, so that service interruption may result, i.e. due to delays at the cell-edges while the mobile terminal acquires information about the target area or cell. Service interruption may also result when a mobile terminal moves from a MBSFN providing an eMBMS multicast service to a MBSFN where the service in question is only available by unicast.

SUMMARY

The present disclosure accordingly provides, in a first aspect, a method comprising, at a mobile terminal: communicating with a serving base station over multicast; receiving a first multicast signal from the serving base station and a second signal from a second base station; determining an indication of the length of a first cyclic prefix of the first multicast signal and an indication of the length of a second cyclic prefix of the second signal; and where the mobile terminal determines that the lengths of the first and second cyclic prefixes are different, initiating a switch in communication between the mobile terminal and the serving base station to unicast.

In this way, detection of a signal with cyclic prefix of different length to the cyclic prefix of the serving signal is exploited to trigger a switch to unicast based on the recognition that detection of the different length cyclic prefix is an indication that the mobile terminal is close to a base station operating in a different MBSFN area or in a different eMBMS cell. Switching a mobile terminal from a multicast service to a unicast service in this way reduces service interruption when moving out of an MBSFN area (whether moving into another MBSFN area or to a non-MBSFN cell).

According to an embodiment, determining that the lengths of the first and second cyclic prefixes are different comprises determining that the number of symbols in a time slot of the first multicast signal is different from the number of symbols in a time slot of the second signal.

According to an embodiment, initiating a switch in communication between the mobile terminal and the serving base station to unicast comprises sending to the serving base station a request to switch communications between the mobile terminal and the serving base station to unicast.

According to an embodiment, initiating a switch in communication between the mobile terminal and the serving base station to unicast comprises notifying the serving base station of detection of different-length cyclic prefixes.

According to an embodiment, the method further comprises, notifying the serving base station in a cyclic prefix length-change request.

The present disclosure accordingly provides, in a second aspect, a mobile terminal for operation in a communications network, in which the mobile terminal comprises: a first transceiver for exchanging signals with a serving base station; a second transceiver for exchanging signals with a second base station; and a processor configured to: receive a first multicast signal from the serving base station and a second signal from a second base station; determine an indication of the length of a first cyclic prefix of the first multicast signal and an indication of the length of a second cyclic prefix of the second signal; and where the mobile terminal determines that the lengths of the first and second cyclic prefixes are different, initiate a switch in communication between the mobile terminal and the serving base station to unicast.

According to an embodiment, the serving base station is comprised in a first MBSFN. The second base station is comprised in a second MBSFN.

According to an embodiment, the first transceiver and the second transceiver are the same.

The present disclosure accordingly provides, in a third aspect, a method comprising, at a base station: serving a mobile terminal over multicast; sending to the mobile terminal a multicast signal comprising a first cyclic prefix with a first length; receiving from the mobile terminal an indication that the mobile terminal has detected a second cyclic prefix with a second length; and switching communicating with the mobile terminal from multicast to unicast.

According to an embodiment, the received indication comprises a request to switch communications between the mobile terminal and the serving base station to unicast.

According to an embodiment, the received indication comprises a notification of detection of different-length cyclic prefixes.

According to an embodiment, the received indication comprises a cyclic prefix length-change request.

According to an embodiment, the second cyclic prefix is received by the mobile terminal in a signal from a second base station.

The present disclosure accordingly provides, in a fourth aspect, a base station for a mobile communications network, in which the base station comprises: a transmitter configured to serve a mobile terminal over multicast and to transmit a multicast signal to the mobile terminal; in which the transmitted multicast signal comprises a first cyclic prefix with a first length; a receiver configured to receive signals from the mobile terminal; and a processor configured to: receive from the mobile terminal, an indication that the mobile terminal has detected a second cyclic prefix with a second length; and switch communication with the mobile terminal from multicast to unicast.

The present disclosure accordingly provides, in a fifth aspect, a computer program element comprising computer program code to, when loaded into a computer system and executed thereon, cause the computer to perform the method set out above.

BRIEF DESCRIPTION OF THE DRAWINGS

In order that the present disclosure may be better understood, embodiments thereof will now be described, by way of example only, with reference to the accompanying drawings in which:

FIGS. 3 and 4 shows sequences of events according to embodiments of the disclosure.

DETAILED DESCRIPTION

Figure 1:
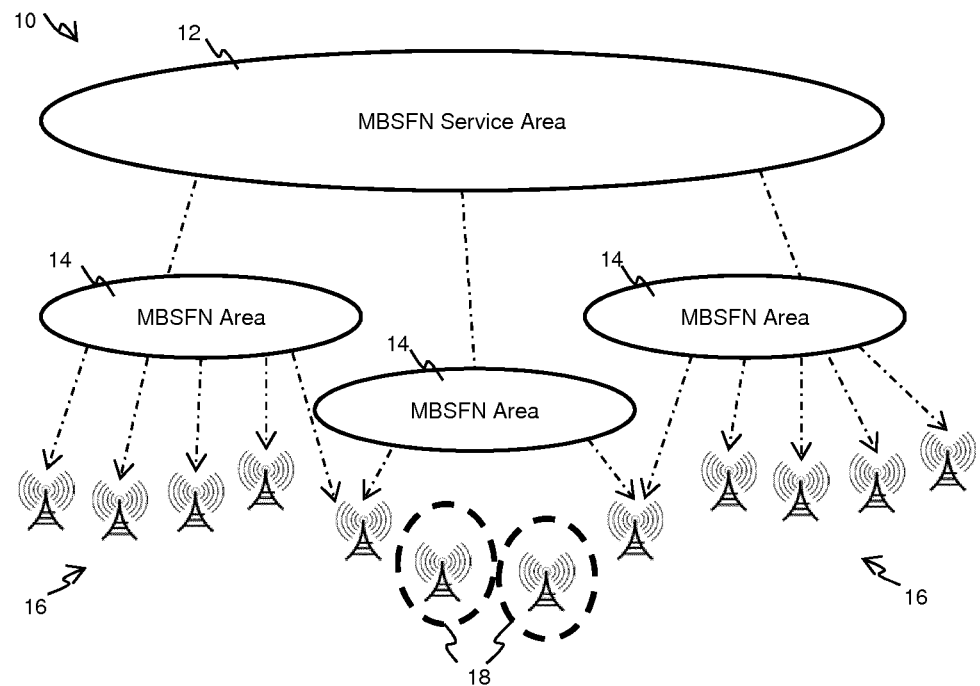
FIGS. 1 and 2 show aspects of a conventional 3GPP mobile communications network.

When a mobile terminal using multicast moves out of an MBSFN area into another MB SFN area or to a cell that does not provide the required eMBMS service, then service interruption may be expected. For mobility between MBSFN areas, there is anticipated to be a service interruption of around 1.5 seconds. This is a combination of mobility time plus the time to read system information block (SIB) messages of the new serving cell. For mobility to a non-MBSFN cell the interruption is anticipated to be around 0.5 seconds. This includes time to read the SIBs of the new serving cell and then to setup a unicast bearer. Switching a mobile terminal from a multicast service to a unicast service reduces service interruption when moving out of an MBSFN area (whether moving into another MBSFN area or to a non-MBSFN cell). Where the switch to unicast occurs while the mobile terminal is still receiving good coverage of its serving base station, then the switch to unicast should further reduce service interruption. For example minimal interruptions may result from an increased likelihood of achieving make-before-break service continuity from multicast to unicast and a reduced likelihood of random access channel failure (which can adversely affect initial call setup step and registration). Where a base station takes responsibility for managing the transition of a mobile terminal that is moving out of an MBSFN area to a different MBSFN area and is able to appropriately manage the timing of a transition from multicast to unicast, this reduces the risk of service interruptions for mobile terminals entering a different MBSFN area (as service interruption for switching from unicast to multicast can be zero).

Embodiments of the disclosure enhance mobile terminal mobility for eMBMS services, including eMBMS services operating in MBSFN architectures, so as to reduce service interruption when a mobile terminal transitions between MBSFN areas or between eMBMS cells. The disclosure relates to techniques that can enable service switching from multicast to unicast when a mobile terminal is likely to transition from being served by a current base station within a first MBSFN area towards being served by a target base station within another MBSFN area. In particular, embodiments of the disclosure can avoid service interruption when a mobile terminal moves between MBSFN areas or between eMBMS cells by defining triggers for initiating switching eMBMS service for the mobile terminal from multicast to unicast before the mobile terminal is transitioned to being served by another eMBMS base station such as a base station in another MBSFN area. According to an embodiment, the trigger is independent of the decision to transition the mobile terminal from being served by the base station currently serving the mobile terminal to being served by a target base station.

The disclosure is based on detection at a mobile terminal of cyclic prefixes (CP) of different lengths issued by different base stations. CPs may be used to avoid inter-symbol interference that can result from multipath propagation delays. The length of a CP will depend on the size of the MBSFN area that a base station issuing the CP belongs to. The inventors have realized that detection at the same mobile terminal of signals with different length CPs can be taken as an indication that the mobile terminal is approaching a boundary between two SFNs and that such an indication may be used to trigger switching the mobile terminal from multicast to unicast and, as a result, avoid service interruption on transitions to a different eMBMS base station or SFN.

Base stations forming part of a wide MBSFN area (e.g. an area for cells that are larger than 5 km in radius) or part of a national MBSFN area can issue longer CPs than base stations forming part of smaller MBSFN areas or not forming part of an area. In order to cope with multipath propagation delays in larger MBSFN areas, 3GPP Release 12 introduced a new CP configuration which extends the normal CP from 7 or 16.7 µs with 15 kHz carrier spacing to 33 µs with 7.5 kHz carrier spacing for larger areas. According to an embodiment, a "switch to unicast" trigger can be established when a mobile terminal detects a base station issuing a different-length CP when compared to the CP issued by the base station currently serving the mobile terminal. According to an embodiment, the base station currently serving the mobile terminal is a MBSFN base station and the target base station is an adjacent, unicast, non-MBSFN base station. According to a further embodiment, the base station currently serving the mobile terminal is a MBSFN base station and the target base station is an adjacent, MBSFN base station.

In Evolved Universal Terrestrial Radio Access Network (E-UTRAN), eMBMS services may be provisioned by defining MBSFN areas within a geographical area designated for broadcast (or multicast) services. A broadcast service area could be a single cell or multiple cells. A multi-cell MBSFN area defines a set of base stations participating in MBSFN service modes. FIG. 1 illustrates a MBSFN network structure. Within MBSFN network 10, an operator operates a MBSFN service area 12 for deploying a broadcast (or multicast) service. Within that service area there may be a plurality of MBSFN areas 14. Each MBSFN area 14 consists of a number of base stations 16, each serving a different cell (not shown). The base stations 16 in a particular MBSFN area 14 are capable of synchronizing together to provide the MBSFN service across multiple cells in the MBSFN area. Some of the base stations 16 within the MBSFN areas 14, serve reserved cells 18. A MBSFN area reserved cell is a cell within a MBSFN area that does not contribute to the MBSFN transmission and may be used for other services, e.g. unicast. Within a MBSFN area, eMBMS can be provided over a single frequency layer dedicated to MBSFN transmission or over a single frequency layer that is shared between MBSFN transmission and unicast services. Where Radio Resource Control (RRC) is used, reception of eMBMS services is available for the mobile terminals in RRC_Connected or RRC_Idle states.

LTE supports overlap between MBSFN service areas, for example, smaller MBSFN areas can overlap larger ones for regional and national coverage. In 3GPP LTE or 4G, one base station can belong to up to eight MBSFN areas. All base stations transmitting MBSFN in a single area are required to be synchronized, so that the same multimedia content is transmitted from all the base station stations with a mutual offset of no more than a few micro-seconds.

Figure 2:
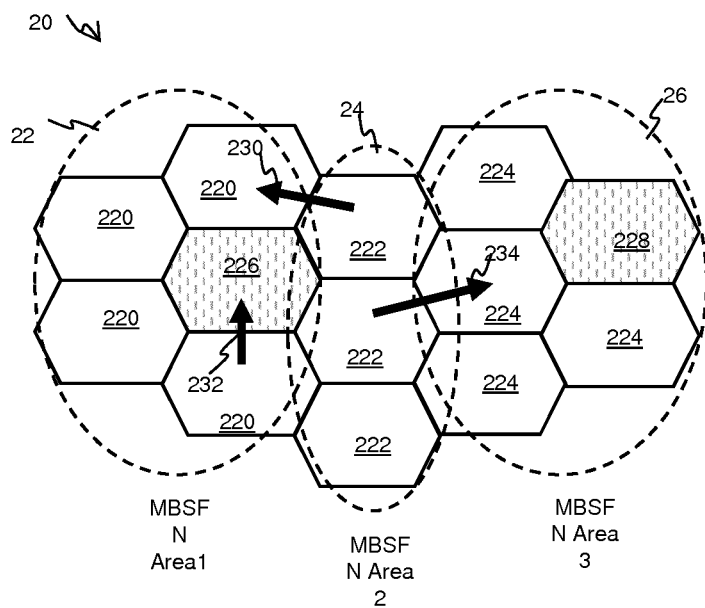

One of the key features of the LTE network is mobility provision. Supporting seamless user mobility across the network requires service continuity for eMBMS users and plays an important role in maintaining service quality and customer satisfaction. There are a number of scenarios where it would be desirable for a LTE mobile terminal to be able to move from one base station to another whilst receiving MBSFN service, for example when the mobile terminal is moving into a MBSFN area reserved cell whilst receiving an eMBMS service and when moving from one MBSFN cell to another cell not within the same MBSFN area. FIG. 2 shows MBSFN service area 20 comprising exemplary MBSFN areas 22, 24 and 26—each MBSFN area comprising a plurality of cells, each cell defined by a different base station (not shown). MBSFN area 22 comprises a plurality of multicast cells 220 and one MBSFN area reserve (unicast) cell 226. MBSFN area 24 comprises a plurality of multicast cells 222 but no MBSFN area reserve (unicast) cell. MBSFN area 26 comprises a plurality of multicast cells 224 and one MBSFN area reserve (unicast) cell 228. Exemplary transitions between the cells of MBSFN service area 20 are shown, as follows. Transitions 230 and 234 represent a mobile terminal passing from one multicast cell to another multicast cell in a different MBSFN area. Transition 232 represents a mobile terminal passing from a multicast cell to an MBSFN area reserved cell in the same MBSFN area. 3GPP standards do not describe any mechanism for switching a mobile terminal that is receiving a multicast service from multicast to unicast.

Figure 8:
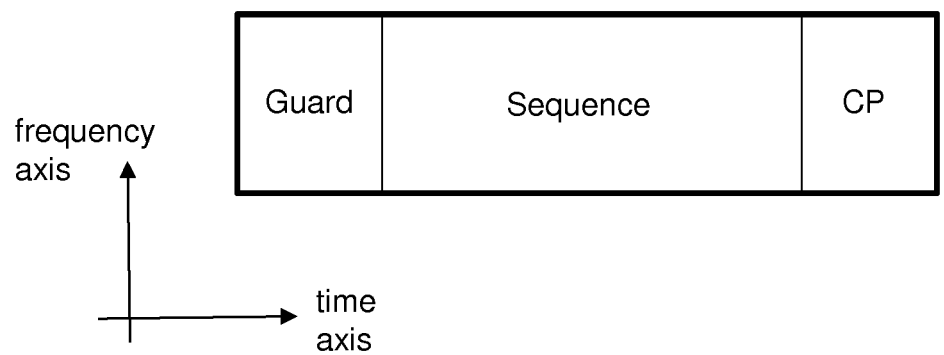
FIG. 8 shows a representation of a 3GPP protocol element used in embodiments of the disclosure.

According to an embodiment, detection of different length CPs is based on detecting a different number of symbols in the time slots of signals from different antennas—i.e. different sectors or base stations. 3GPP specifies a Physical Random Access Channel (PRACH) used by the UE to carry random access preambles for initiation of random access procedure. A simplified view of the structure of a PRACH is shown in FIG. 8, from which it will be seen that it comprises a sequence framed by a guard band and the CP, and occupies one or more time slots and, along the frequency axis, one or more channels in an LTE uplink frame. According to an embodiment, an indication of CP length is derived by the mobile terminal decoding a LTE secondary synchronization signal (SSS) received in signals sent from nearby base stations, including the current, serving base station and at least one other base station. From the decoded SSS detected in received signals, the mobile terminal is able to derive an indication of the CP length associated with each received signal and, in particular, to detect when CPs of different length are present in different received signals. The mobile terminal does this by working out how many OFDM symbols there are in a time slot (as a longer CP leaves less space in the timeslot for OFDM symbols). That is, the fewer symbols that are present in a time slot of a signal, the longer the CP of that signal will be. Detection of CP lengths according to an embodiment of the disclosure, is shown in FIG. 3, 301-305. At 301, a search is carried out by a mobile terminal for signals from nearby base stations. Where signals from a base station are detected, the mobile terminal detects primary synchronization signal (PSS) at 302 from which it acquires physical cell ID (PCI), time slot and frame synchronization. Following detection of PSS, the mobile terminal decodes SSS at 303. Where signals from base stations other than the currently serving base station are received in addition to signals from the currently serving base station, the mobile terminal calculates at 304 from the decoded SSS for each received signal, the number of symbols per time slot. At 305, the mobile terminal uses the results to determine if different received signals are carrying CPs of different lengths. If no CPs of different length are detected at 305, then the mobile terminal continues to search for base station signals carrying CPs of different length. If CPs of different length are detected at 305, then action is taken as shown in FIG. 3, 306-307 to switch to unicast, communications between the mobile terminal and the serving base station. A similar detection of CP lengths according to an embodiment of the disclosure, is shown in FIG. 4, 401-405.

According to an embodiment of the disclosure, the mobile terminal notifies the base station when it detects CPs of different length. Once the mobile terminal has identified, in a signal received from a base station other than the serving base station, a CP of different length to the CP detected in a signal received from the serving base station, the mobile terminal notifies the serving base station of detection of the different-length CP. Upon receiving notification from the mobile terminal of detection of the different-length CP, the serving base station switches the mobile terminal from multicast to unicast.

According to an embodiment of the disclosure, the mobile terminal notifies the serving base station in a CP length-change request. Returning to FIG. 3, where CPs of different length are detected at 305, then at 306 the mobile terminal sends to the base station, PRACH with CP length change request over PUCCH 306. On receipt of the change request, the base station switches, at 307, communications between the mobile terminal and the serving base station to unicast.

According to an embodiment of the disclosure, when the mobile terminal detects CPs of different length, the mobile terminal requests the network to switch the mobile terminal from multicast to unicast. According to one embodiment, the mobile terminal request is directed to the serving base station. 3GPP Release 12 has introduced a Group Communication Server Application Server (GCS AS). The GCS AS function is to signal to the mobile terminal the required configuration information that the mobile terminal needs in order to receive application data via eMBMS bearer services. According to a further embodiment, the mobile terminal request is directed to the GCS AS. Returning to FIG. 4, where CPs of different length are detected at 405, then at 406, the mobile terminal sends to the base station a request to switch communications between the mobile terminal and the serving base station to unicast. On receipt of the switch request, the base station switches, at 407, communications between the mobile terminal and the serving base station to unicast.

Figure 5:
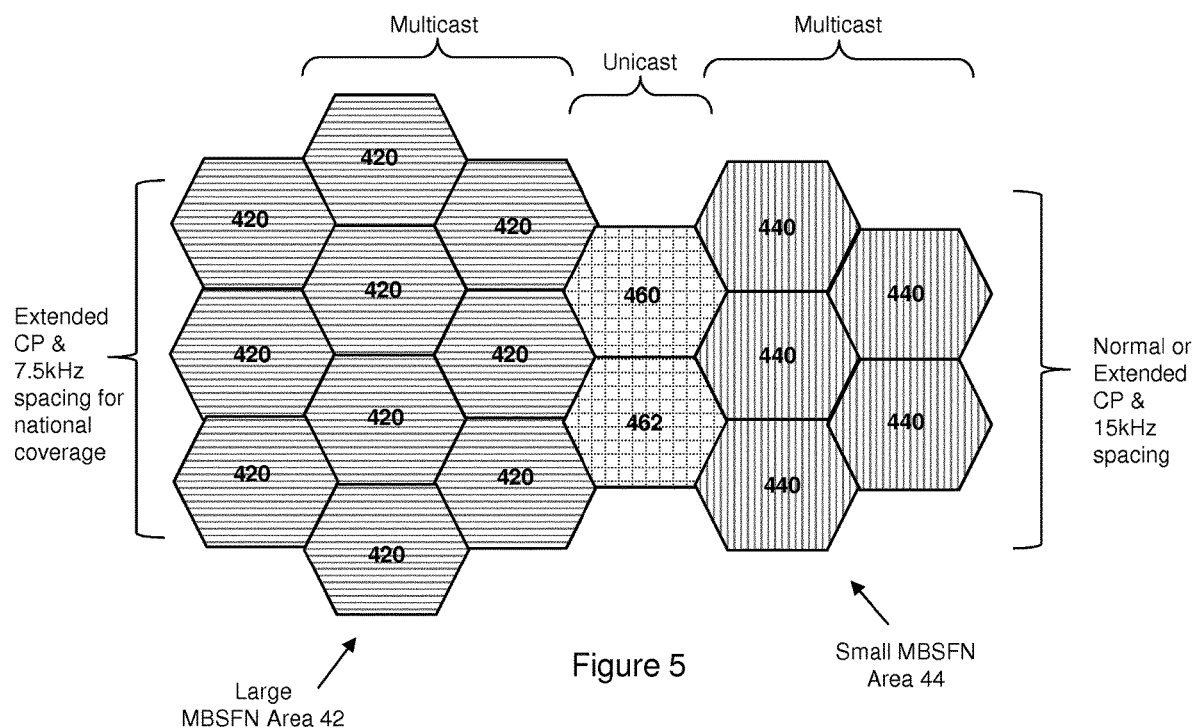
FIGS. 5 and 6 show aspects of a conventional 3GPP mobile communications network.

FIG. 5 shows a mobile communications network, by way of example, a LTE network 40 compromising a first MBSFN area 42 comprising cells 420 and a second, smaller MBSFN area 44 comprising cells 440. Base stations in the larger, first MBSFN area 42 use CP with a duration of 33 μs at 7.5 kHz carrier-spacing. Base stations in the smaller, second MBSFN area 44 use CP with a duration of 7 or 16.7 μs at 15 kHz carrier-spacing. First MBSFN area 42 and a second MBSFN area 44 overlap at cells 460 and 462, which form part of both first and second MBSFN areas. Shared cells 460, 462 may be unicast or multicast. Any of shared cells 460, 462 operating as unicast will use a CP with a duration of 7 or 16.7 μs at 15 kHz carrier-spacing, Any of shared cells 460, 462 operating as multicast may use a CP with either 33 μs duration at 7.5 kHz carrier-spacing or a CP with 7 or 16.7 μs duration at 15 kHz carrier-spacing. The other cells: 420 in first MBSFN area 42 and 440 in second MBSFN area 44, are multicast. First MBSFN area 42 therefore comprises multicast cells 420 together with cells 460, 462 and serves a first eMBMS service. Second MBSFN area 44 comprises multicast cells 440 together with cells 460, 462 and serves a second eMBMS service.

Figure 6:
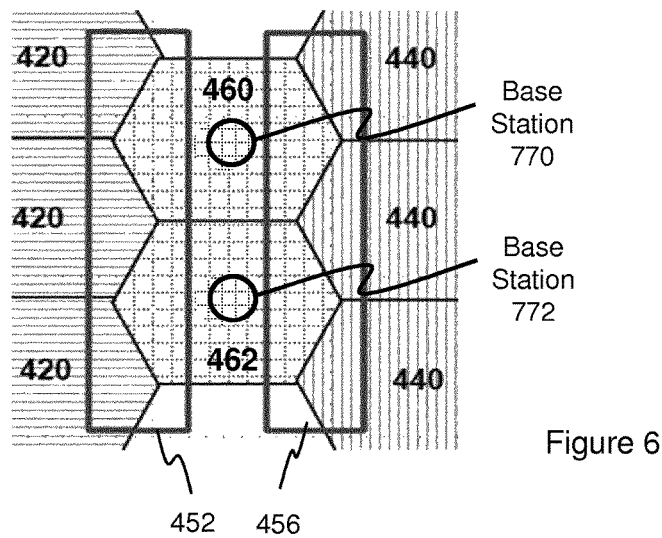

FIG. 6 shows cell 460, 462 in more detail according to further embodiments of the disclosure. Each cell in FIG. 6 comprises a base station, although only base stations 770, 772 in cells 460, 462 is shown in FIG. 6. In FIG. 6, a region 452 covers the edges of cells 460, 462 close to large MBSFN area 42 and the edges of cells 420 of large MBSFN area 42 located close to cells 460, 462. Mobile terminals located in the region 452 will detect signals served by at least one of base stations 770, 772 in cells 460 and 462 and also will detect signals served by at least one base station (not shown) of cells 420 of large MBSFN area 42 that are located close to cells 460, 462.

Similarly, In FIG. 6, a region 456 covers the edges of cells 460, 462 close to small MBSFN area 44 and the edges of cells 440 of small MBSFN area 44 located close to cells 460, 462. Mobile terminals located in a region 456 will detect signals served by at least one of base stations 770, 772 and also will detect signals served by at least one base station (not shown) of cells 440 of small MBSFN area 44 that are located close to cells 460, 462.

Where a mobile terminal detects signals served by one of base stations 770, 772 that have a first CP length and coincidentally detects signals served by one of the base stations in cells 420 or 440 that have a different CP length, the mobile terminal identifies a trigger for initiating switching to unicast.

Figure 7:
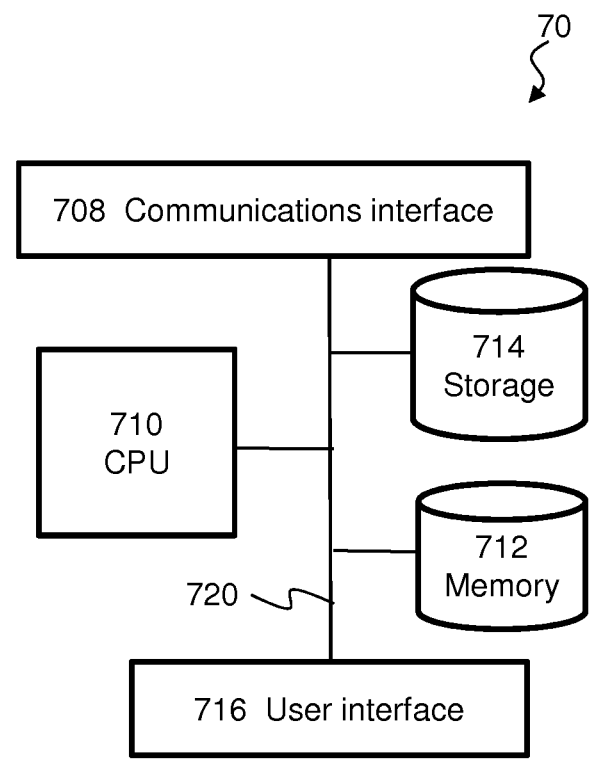
FIG. 7 is a block diagram of a computer system suitable for the operation of embodiments of the present disclosure.

Insofar as embodiments of the disclosure described are implementable, at least in part, using a software-controlled programmable processing device, such as a microprocessor, digital signal processor or other processing device, data processing apparatus or system, it will be appreciated that a computer program for configuring a programmable device, apparatus or system to implement the foregoing described methods is envisaged as an aspect of the present invention. The computer program may be embodied as source code or undergo compilation for implementation on a processing device, apparatus or system or may be embodied as object code, for example. FIG. 7 is a block diagram of a programmable device, apparatus or system 70 suitable for the operation of embodiments of the present invention. According to an embodiment of the disclosure, central processor unit (CPU) 710 utilizes the program or a part thereof to configure it for operation and is communicatively connected via a data bus 720 to a communications interface 708, a memory 712, a storage 714 and a user interface 716. The memory 712 can be any read/write storage device such as a random access memory (RAM) or a non-volatile storage device suitable for storing data for use by processor 710. Suitably, the computer program is stored in storage 714 in machine or device readable form. For example, storage 714 may comprise solid-state memory, magnetic memory such as disk or tape, optically or magneto-optically readable memory such as compact disk or digital versatile disk, etc. The computer program may be supplied from a remote source embodied in a communications medium such as an electronic signal, radio frequency carrier wave or optical carrier wave. Such carrier media are also envisaged as aspects of the present invention. The storage 714 can be any read-only or read/write storage device such as a random access memory (RAM) or a non-volatile storage device suitable for storing program code for controlling the operation of processor 710. Memory 712 and storage 714 may comprise the same device or devices. An example of a non-volatile storage device includes a disk or tape storage device. The user interface 716 is an interface to devices for the input or output of data provided to or received from a user or operator of the programmable device, apparatus or system 70. Examples of devices connectable to user interface 716 include a keyboard, a mouse, a display (such as a monitor) and a network connection for communication with a remote user or operator. Communications interface 708 is an interface to other devices and may comprise one or more radio transceiver interfaces and one or more wired or wireless network interfaces.

The present disclosure has application to audio and video broadcasting but also file broadcasting in mobile networks. In addition to mobile networks, the present disclosure may also have application to femtocell and small cell deployments, for example, in pre-loading certain content on devices to enhance QoE and optimize use of resources. Similar scenarios may arise for simultaneous software updates on multiple devices. The present disclosure has been described in an LTE context that could be deployed with existing multicast mobile networks, but the disclosure can be applied in any multicast mobile network where the network elements have similar roles regarding unicast and multicast service provision. When referring in the present application to a comparison of the quality of a signal, whether it is with the quality of a another signal or with a threshold, it will be understood that the comparison may trigger a change of state, depending on context, on the detection of the quality of a signal becoming at least one of less than, greater than and equal to the comparator signal or threshold.

As set out in the Abstract hereto, the disclosure relates to a mobile terminal: communicating with a serving base station over multicast; receiving a first multicast signal from the serving base station and a second signal from a second base station; determining an indication of the length of a first cyclic prefix of the first multicast signal and an indication of the length of a second cyclic prefix of the second signal; and where the mobile terminal determines that the lengths of the first and second cyclic prefixes are different, initiating a switch in communication between the mobile terminal and the serving base station to unicast. In complementary fashion, the invention relates to a base station serving a mobile terminal over multicast; sending to the mobile terminal a multicast signal comprising a first cyclic prefix with a first length; receiving from the mobile terminal an indication that the mobile terminal has detected a second cyclic prefix with a second length and switching communicating with the mobile terminal from multicast to unicast.

It will be understood by those skilled in the art that, although the present disclosure has been described in relation to the above described example embodiments, the disclosure is not limited thereto and that there are many possible variations and modifications which fall within the scope of the invention. It is recalled that in the above description, and in the following claims, the term "multicast" is used to include "broadcast" and vice versa.

The scope of the present invention includes any novel features or combination of features disclosed herein. The applicant hereby gives notice that new claims may be formulated to such features or combination of features during prosecution of this application or of any such further applications derived therefrom. In particular, with reference to the appended claims, features from dependent claims may be combined with those of the independent claims and features from respective independent claims may be combined in any appropriate manner and not merely in the specific combinations enumerated in the claims.

The invention claimed is:

1. A method comprising, at a mobile terminal:
communicating with a serving base station over broadcast or multicast;
receiving a first broadcast or multicast signal from the serving base station and a second signal from a second base station;
determining an indication of a length of a first cyclic prefix of the first broadcast or multicast signal and an indication of a length of a second cyclic prefix of the second signal; and
where the mobile terminal determines that the lengths of the first and second cyclic prefixes are different, initiating a switch in communication between the mobile terminal and the serving base station to unicast.

2. A method as claimed in claim 1, wherein determining that the lengths of the first and second cyclic prefixes are different comprises determining that a number of symbols in a time slot of the first broadcast or multicast signal is different from a number of symbols in a time slot of the second signal.

3. A method as claimed in claim 1, wherein initiating a switch in communication between the mobile terminal and the serving base station to unicast comprises sending to the serving base station a request to switch communications between the mobile terminal and the serving base station to unicast.

4. A method as claimed in claim 1, wherein initiating a switch in communication between the mobile terminal and the serving base station to unicast comprises notifying the serving base station of detection of different-length cyclic prefixes.

5. A mobile terminal for operation in a communications network, wherein the mobile terminal comprises:
a first transceiver for exchanging signals with a serving base station;
a second transceiver for exchanging signals with a second base station; and
a processor configured to:
receive a first broadcast or multicast signal from the serving base station and a second signal from a second base station;
determine an indication of a length of a first cyclic prefix of the first broadcast or multicast signal and an indication of a length of a second cyclic prefix of the second signal; and
where the mobile terminal determines that the lengths of the first and second cyclic prefixes are different, initiate a switch in communication between the mobile terminal and the serving base station to unicast.

6. The mobile terminal as claimed in claim 5, wherein the serving base station is comprised in a first multicast-broadcast single-frequency network (MBSFN).

7. The mobile terminal as claimed in claim 6, wherein the second base station is comprised in a second MBSFN.

8. The mobile terminal as claimed in claim 5, wherein the first transceiver and the second transceiver are the same.

9. A method comprising, at a base station:
serving a mobile terminal over broadcast or multicast;
sending to the mobile terminal a broadcast or multicast signal comprising a first cyclic prefix with a first length;
receiving from the mobile terminal an indication that the mobile terminal has detected a second cyclic prefix with a second length; and
switching communicating with the mobile terminal from broadcast or multicast to unicast.

10. A method as claimed in claim 9, wherein the received indication comprises a request to switch communications between the mobile terminal and the serving base station to unicast.

11. The method of claim 9, wherein the second cyclic prefix is received by the mobile terminal in a signal from a second base station.

12. A non-transitory computer-readable computer program element comprising computer program code to, when loaded into a computer system and executed thereon, cause the computer system to perform the method as claimed in claim 1.

13. A base station for a mobile communications network, wherein the base station comprises:
a transmitter configured to serve a mobile terminal using broadcast or multicast and to transmit a broadcast or multicast signal to the mobile terminal, wherein the transmitted broadcast or multicast signal comprises a first cyclic prefix with a first length;
a receiver configured to receive signals from the mobile terminal; and
a processor configured to:
receive from the mobile terminal an indication that the mobile terminal has detected a second cyclic prefix with a second length; and
switch communication with the mobile terminal from broadcast or multicast to unicast.

* * * * *